United States Patent
Chambers

[19]

[11] Patent Number: 6,018,500
[45] Date of Patent: Jan. 25, 2000

[54] RADON MOVEOUT

[75] Inventor: Ronald E. Chambers, Houston, Tex.

[73] Assignee: Baker Hughes Incorporated, Houston, Tex.

[21] Appl. No.: 09/252,833

[22] Filed: Feb. 19, 1999

[51] Int. Cl.$^7$ .................................... G01V 1/00
[52] U.S. Cl. .................. 367/73; 367/43; 367/49
[58] Field of Search ................... 367/43, 73, 48, 367/58, 74, 49

[56] References Cited

U.S. PATENT DOCUMENTS

| | | | |
|---|---|---|---|
| 4,628,492 | 12/1986 | Winney | 367/63 |
| 4,760,563 | 7/1988 | Beylkin | 367/73 |
| 4,779,238 | 10/1988 | Howard | 367/63 |
| 5,719,822 | 2/1998 | Wang | 367/53 |

OTHER PUBLICATIONS

Inverse Velocity Stacking for Multiple Elimination, Dan Hampton, 1987 Seg, 24 pages+14 Figures.

*Primary Examiner*—Christine K Oda
*Assistant Examiner*—Anthony Jolly
*Attorney, Agent, or Firm*—Madan, Mossman & Sriram, P.C.

[57] ABSTRACT

A conventional CMP gather is Radon transformed from t-x space to the $\tau$-p domain. The Radon-transformed data are windowed or zoned into a plurality of data sets, each having an common independent range of selected characteristics. All except one data set are muted. The zero ordinate of the p-axis is shifted to become centered through the contents of the retained data set which is then inverse-transformed back to t-x space. The process is repeated for each of the remaining windowed data sets. The processed windowed data sets are summed.

11 Claims, 5 Drawing Sheets

RADON MOVEOUT

BACKGROUND OF THE INVENTION

1. Field of the Invention

This is a method for processing seismic signals to improve the resolution of desired signals in the presence of unwanted signals.

2. Discussion of Relevant Art

The art of seismic exploration for natural resources is very well known. Nevertheless, a brief tutorial follows.

An acoustic source of any well-known type is caused to radiate a wavefield (fire a shot) into a body of water from a source location at or near the surface. The wavefield may be radiated by an impulsive device such as air gun, by a chirp-signal generator or by an implosive device. The acoustic radiator may be a single point-source or an array of point sources arranged in a desired pattern. Hereinafter for brevity, we will simply use the term "source". Activation of a source is a "shot".

The radiated wavefield propagates in all directions, insonifying the subsurface earth layers whence the wavefield is reflected back to the surface of the earth where the reflected wavefield is detected by one or more acoustic receivers. The acoustic receivers may be of any type having a capability for converting mechanical wavefields to electrical signals. Suitable receivers for deep water marine use include pressure sensors (hydrophones) that are omni-directionally responsive to acoustic stimuli. The term "receiver" as used herein includes a single instrument or a group of several electrically-interconnected receivers arranged in a desired geometric pattern at or near the surface of the earth.

In deep-water marine operations, the receivers are mounted in a long streamer cable and towed behind a ship along a line of survey. The electrical signals from the receiver(s) are delivered through data transmission means installed in the cable to signal conditioning and archival data storage channels, one channel per receiver. The data transmission means may be electrical-wireline, optical, or ethereal in nature. Acoustic data-transmission channels are also known.

The electrical signals representative of the arrival times of reflected wavefields at the respective receivers are digitized and recorded on reproducible, computer-readable recording media such as, but not limited to, photographic time scale recordings, magnetic tapes, floppy disks, CD-ROMs or any other archival data-recording device now known or as yet unknown.

The recorded data may be sent to a processing center where the data are introduced to a suitable general purpose computer which is programmed to process the seismic data, thereby to construct a model of the earth's subsurface. Programs in the computer include formulations and algorithms that exist for the sole purpose of operating on the digitized seismic data signals to convert those signals into a different state such as a desired visual model of a volume of the earth. The resulting model is used by geologists in recovering valuable natural resources such as oil, gas or other useful minerals for the benefit of humankind. That is, data-processing algorithms exist to process the gathered seismic signals into a useful, human-interpretable format; the data are not gathered simply to provide a solution to some naked algorithm.

Geophysical studies may be one- or multi-dimensional. In a two-dimensional survey by way of example but not by way of limitation, a source and an array including a plurality, numbering in the hundreds or thousands, of spaced-apart receivers are towed along a line of survey as previously explained, one receiver or receiver group per data channel. The receivers, preferably separated from one another by an interval such as 25 meters, are distributed along the line of survey at increasingly greater offset distances from the source. The range in offsets from a source, which is usually towed close to the towing ship, ranges from 200 meters to the nearest receiver to as much as 30 kilometers to the most distant receiver. The source is usually fired at timed intervals such that, at the usual ship velocity of six knots, the physical locations of the source, at the actual times of successive firings, are spaced-apart by some multiple of the receiver spacing such as 100 meters.

Unwanted noise contaminates the desired seismic signals. The term noise is defined as any unwanted seismic signal. Noise may be random or coherent. Random noise may be filtered out by use of various well-known forms of stacking such as common midpoint(CMP) gathers. However coherent noises, such as multiple reflections, that often occupy the same domain in time and space as the desired signals, requires a more sophisticated filtering process.

One such process may be implemented by use of the well-known Radon transform. For example, Beylkin, in U.S. Pat. No. 4,760,563, which issued Jan. 9, 1986, discloses a method and system for discrete transformation of measurements such as seismic data into and out of tau-p space which is both exact and practical in terms of processing time. The measurements can be filtered or otherwise processed in tau-p space in ways which are not practical or possible in their original space. Since the transformations into and out of tau-p space are exact, the filtered and transformed measurements are free of certain errors and distortions that perturb known approximate transforms which can be performed in a reasonable time. When the transformation process is carried out in frequency space, it is done frequency-by-frequency, and when it is carried out in the spatial domain, it can utilize a transformation matrix having a block circulant structure. In each case, the transformation process and matrix have a structure which substantially reduces storage and processing requirements as compared with other known prior art.

D. Hampson, in a paper delivered at the annual International SEG convention in 1987, entitled *Inverse Velocity Stacking for Multiple Elimination*, models and attenuates long period multiple reflections by incorporating a parabolic modeling scheme in place of a hyperbolic modeling algorithm.

Beylkin offers a novel approach but the requirement for a transform first to tau-p space and later a second transform to $(f-k_p)$ space and back render that process greedy of computer time. Hampson offers a more economical process in terms of computing time. However, there remains a need to provide an even simpler method for resolving interfering events and for scavenging unwanted noise, both coherent and random.

SUMMARY OF THE INVENTION

The method of this invention contemplates assembling a plurality of seismic data traces formatted as a common midpoint gather in t-x space. A forward Radon transform from t-x space to the τ-p domain is applied to the moveout-corrected data traces of the common midpoint gather. The p-values are zoned in a series of consecutive windows having a predetermined range, the numerical values of which may overlap. Within each p-window, inversely transforming the seismic data traces from the τ-p domain to t-x space to provide a set of filtered common midpoint gathers. The filtered common midpoint gathers are then summed and are available as a filtered data set for use in any desired subsequent data analysis process. In particular embodiments of the invention, normal moveout may be applied to the common midpoint gather in t-x space prior to applying the forward Radon transform and inverse moveout is then applied to the filtered common midpoint gathers prior to summing. The moveout that is applied may be either linear, hyperbolic, or a combination of hyperbolic and quartic. Further, in particular embodiments of the invention, the Radon transform applied may be either linear, hyperbolic, parabolic or quartic.

BRIEF DESCRIPTION OF THE DRAWINGS

The novel features which are believed to be characteristic of the invention, both as to organization and methods of operation, together with the objects and advantages thereof, will be better understood from the following detailed description intended as a definition of the limits of the invention.

DETAILED DESCRIPTION OF THE PREFERRED EMBODIMENT

Figure 2:
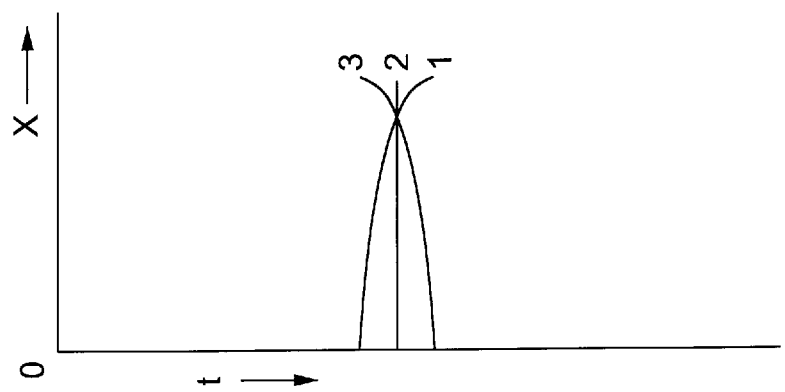
FIG. 2 shows the three events of FIG. 1 after application of hyperbolic moveout.
Figure 1:
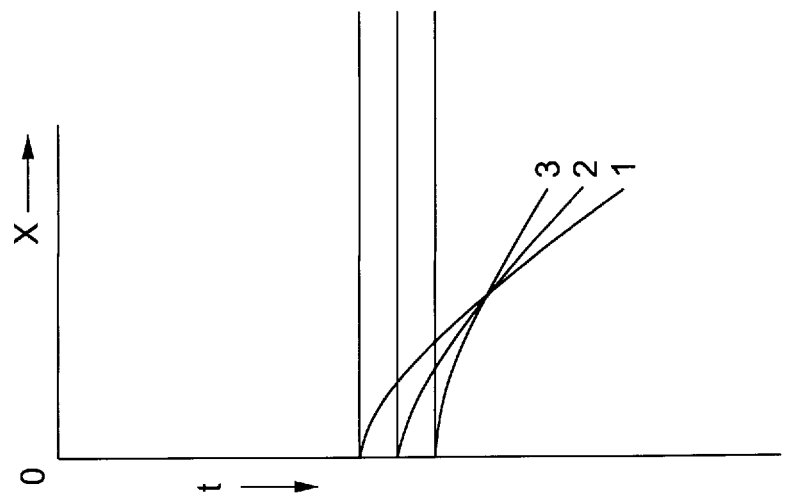
FIG. 1 is a common midpoint gather (CMP) in t-x space representative of three interfering events.

FIG. 1 is a schematic model of a common midpoint (CMP) gather of three raw seismic reflected events displayed in t-x (time-offset) space. By reason of the apparent velocity sequence in the earth layers whence the seismic reflection data originated, the events interfere with each other at long offsets. Hyperbolic moveout has been applied in the usual manner to the three raw events of FIG. 1 as shown in FIG. 2. Event 1 is undercorrected while event 3 as been overcorrected. The droop or moveout deficit (positive or negative) may be due to neglect of higher-order terms which can become significant in the moveout equation at extreme offset distances of several tens of kilometers.

The problem of interfering events can be addressed by application of a Radon transform, using any scheme well known to geophysical analysts, to transform the CMP data from t-x space to the τ-p domain. Subsequent windowing and filtering steps are then performed. The transform may be characterized by linear, hyperbolic, parabolic or quartic implementation, the higher-order operations being sometimes required in the presence of extremely long offsets on the order of 30 kilometers or more.

Figure 3:
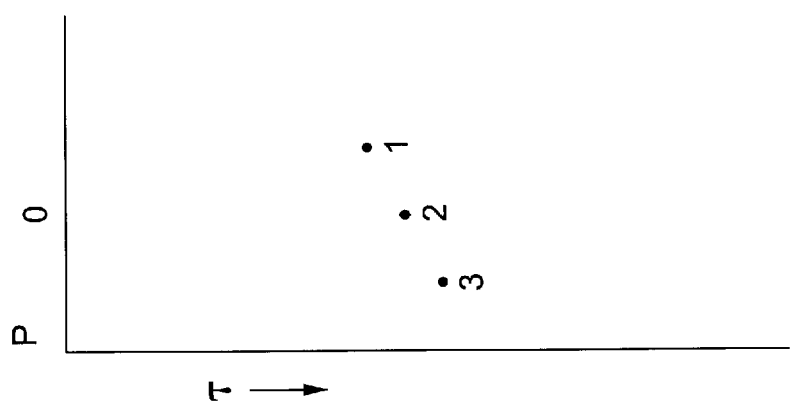
FIG. 3 is the CMP gather of FIG. 2 after Radon transform from t-x space to the τ-p domain.

FIG. 3 shows the three events transformed to the τ-p domain. It will be remembered that the quantity, p, is the slowness in units of time per units of offset, that is, the reciprocal of the apparent velocity of an event at zero offset. Typically, p might be expressed as milliseconds per meter. A perfectly flat event would exhibit a velocity approaching infinity and hence the value of p would approach zero. In FIG. 3, flat event 2 is plotted at $t=\tau_0$, $p=0$ whereas event 1, having a downward droop, plots at $t_1=\tau_{0-\delta t}$, $p_1=p+\alpha$, where $\alpha=1/V_1$, the apparent velocity at event 1. Event 3, having a residual moveout deficit upwards, plots at $t_3=\tau_{0+\delta t}$, $p_3=p-\beta$ where $\beta=1/V_3$.

Given the information of FIG. 3, the challenge is to transform that data back into t-x space clearly without the destructive overlapping of the three events. To that end, I window the data of FIG. 3 into several zones, as suggested in FIGS. 4A, 4B and 4C. Each of the windows, embraces a pre-selected p-value range that is centered about a grouping of events having a range of selected common characteristics such as residual moveout or droop. The range of p-values for each window is empirical, based upon experience in the region of interest.

Figure 4C:
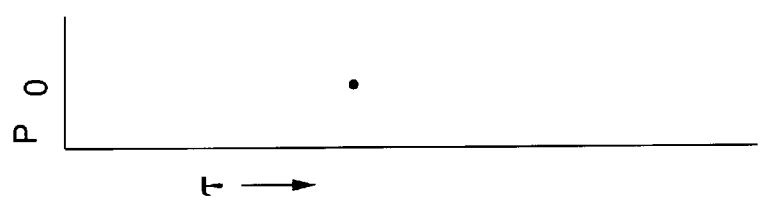
FIGS. 4A, 4B, 4C respectively show the apportionment of the three events of FIG. 3 among the respective p-windows following the p-windowing step.
Figure 4B:
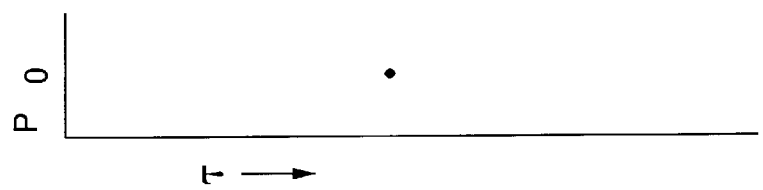

Assuming zero dip, at zero offset the velocity for all events within a particular window should approach infinity. Therefore, the mid p-value for each window of the Radon-transformed data, by a coordinate shift, may be set to zero as shown in FIGS. 4A, 4B and 4C.

Figure 5B:
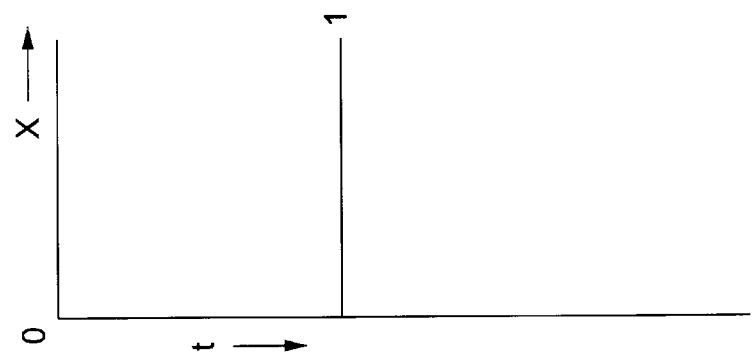
FIG. 5B is windowed event 1 after inverse Radon transform to t-x space.
Figure 5A:
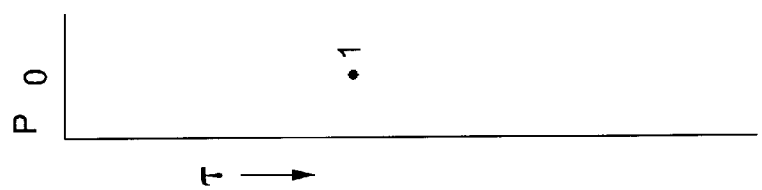
FIG. 5A shows the first p-windowed event in the τ-p domain.
Figure 4A:
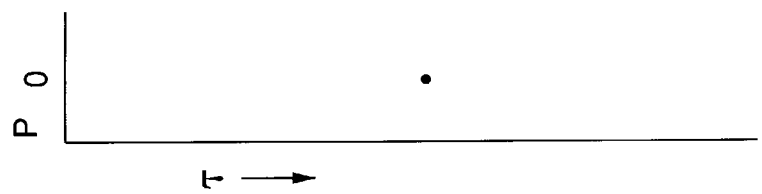
Figure 7B:
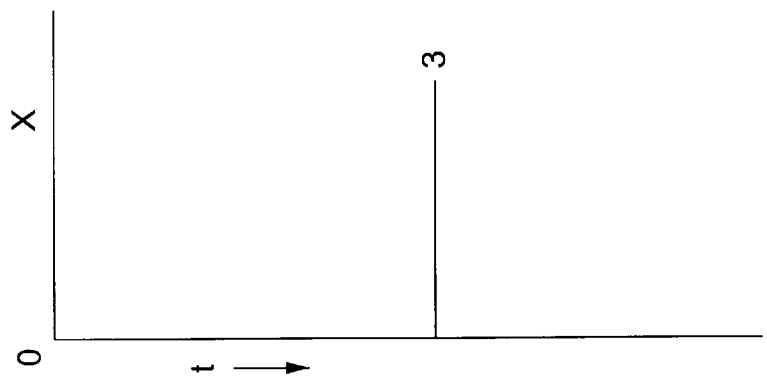
FIGS. 7A and 7B show windowed event 3 before and after inverse Radon transform.
Figure 7A:
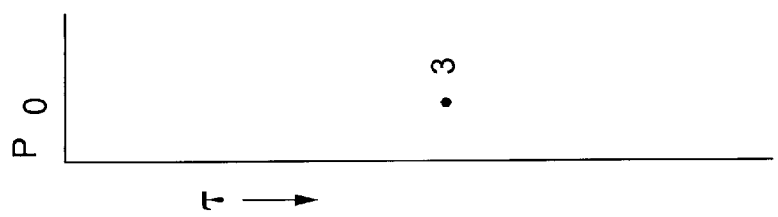
Figure 6B:
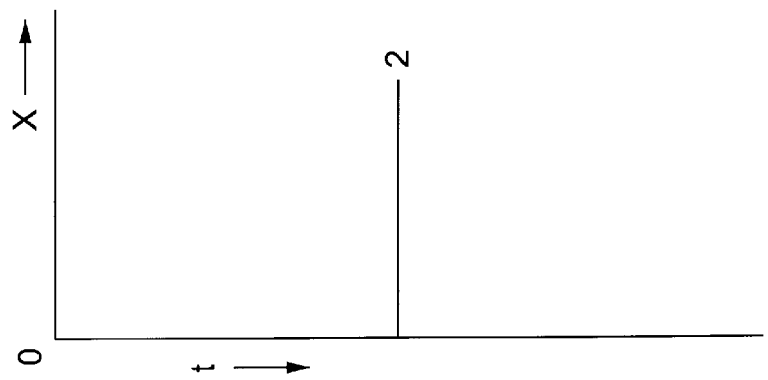
FIGS. 6A and 6B show windowed event 2 before and after inverse Radon transform.
Figure 6A:
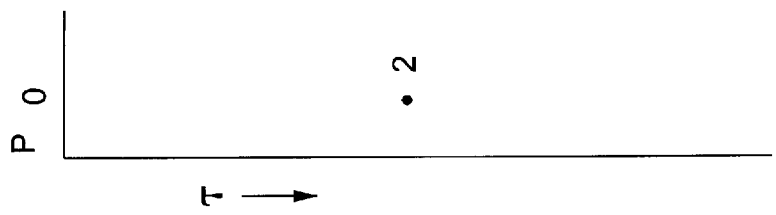

FIG. 5A shows the p-windowed, Radon-transformed data for event 1 taken from FIG. 4A. FIG. 5B represents that same data following an inverse Radon transform from the τ-$p_1$ domain to t-x space. FIGS. 6A and 6B, 7A and 7B, show the results of similar operations on events 2 and 3. The windowing operation results, in this exemplary case, in three distinct CMP gathers in place of the original single CMP gather.

In effect, in the above process, the Radon-transformed data are separated into zoned data sets characterized by a range of common selected characteristics such as the moveout deficit shown in FIG. 2. The moveout deficit may be positive or negative. All except one set of the transformed data sets are muted using any well known technique. The zero ordinate of the p-axis is shifted to become centered through the retained data set which is then independently inversely transformed back into t-x space. The process is repeated for each of the remaining data sets. Thus, in FIG. 5A, event 1 is processed while events 2 and 3 are muted. Event 1 is muted while event 2 is processed etc.

Figure 9:
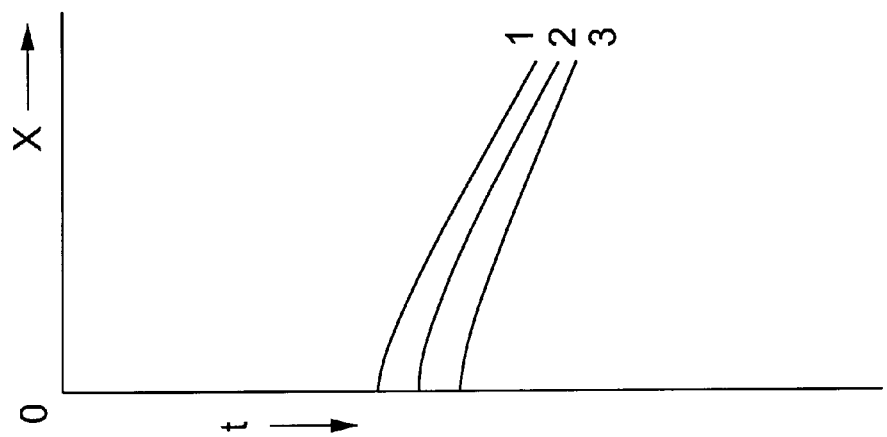
FIG. 9 is the CMP gather of FIG. 8 following application of inverse hyperbolic moveout.
Figure 8:
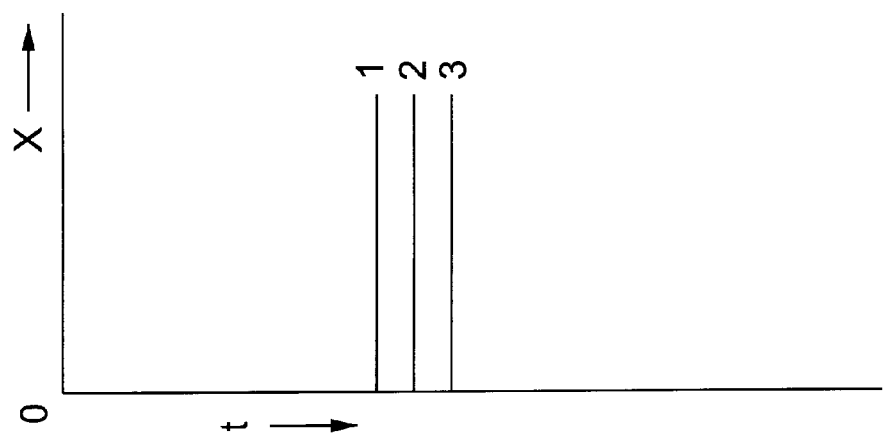
FIG. 8 shows the CMP gather after p-windowing, inverse Radon transform and common offset sum in t-x space.

FIG. 8 shows the CMP gather after p-windowing, inverse Radon transform and common offset merge. In FIG. 9, inverse hyperbolic moveout has been applied to the filtered CMP data of FIG. 8. The previously interfering events have been clearly resolved as desired.

Figure 10:
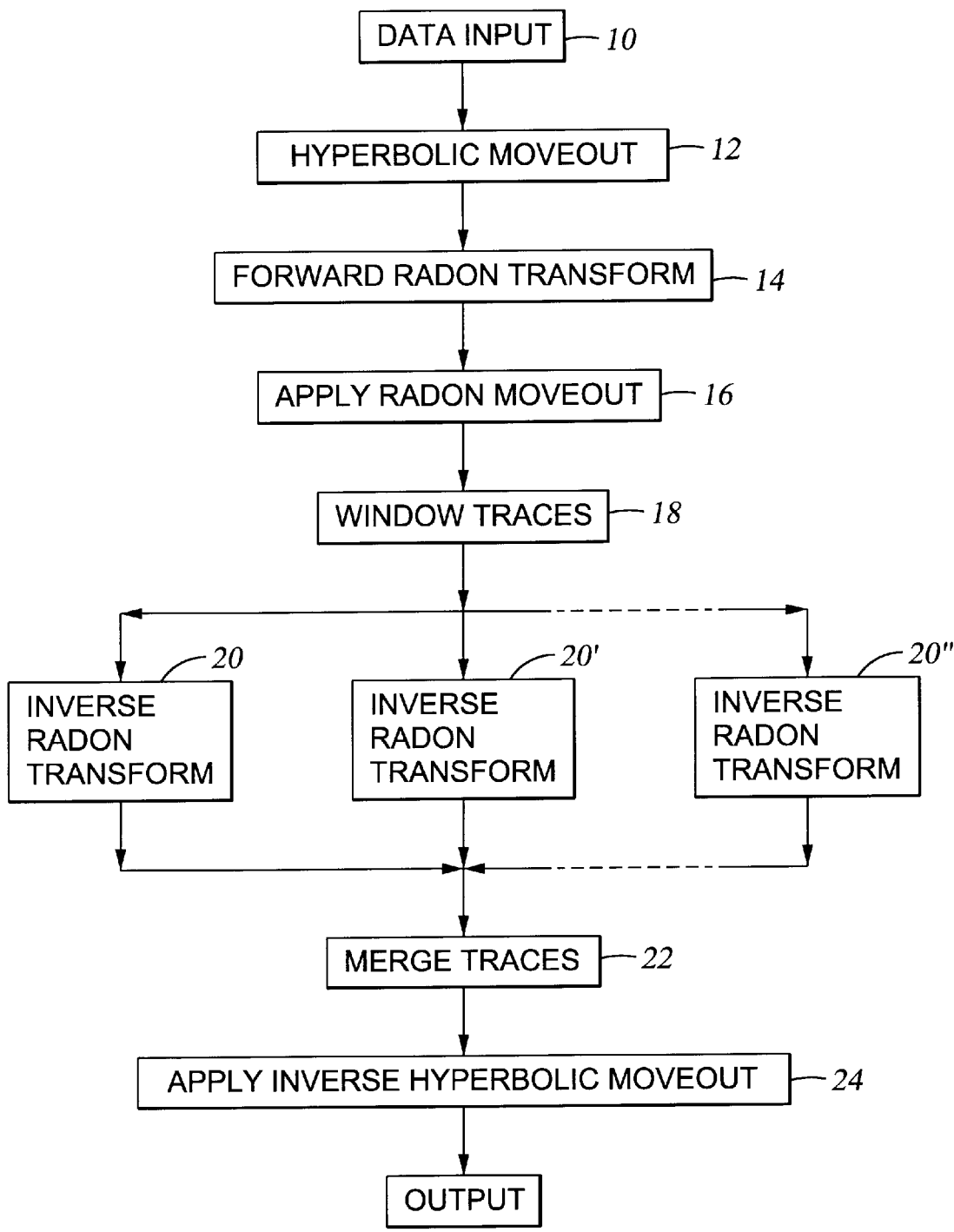
FIG. 10 is a flow chart illustrating the steps of the invention.

The best mode of operation is most easily explained by means of the flow diagram shown in FIG. 10. At 10, the seismic data are input to a processor which may be a computer programmed to perform the operations described herein. The incoming data are combined into common midpoint gathers in the usual manner. Normal moveout, which in a particular embodiment may be hyperbolic moveout, is applied at step 12, whereupon a forward Radon transform from t-x space to the τ-p domain is applied at step 14. The transform may be linear, hyperbolic, parabolic or quartic at the option of the user. Additional moveout processing and filtering may be applied at step 16. At step 18, the data are zoned into windows, $p_i$, along the p-coordinate. The transformed data embraced within each window are separately inversely transformed from the τ-p domain to t-x space at steps 20, 20', 20", thereby to provide several distinct CMP gathers. The dashed lines suggest expansion, if needed, into more than the three zones suggested by the diagram. The now-revised windowed, filtered, inversely-transformed gathers are merged or summed into a single trace at step 22. Inverse moveout is applied at step 24 to provide properly-resolved CMP data which are now in condition for application of any desired conventional processing required in the geologic region of interest.

This invention has been described with a certain degree of specificity by way of example but not by way of limitation. For example, the data were divided into three zones of p-values. There is no particular restriction on the number of data sets used in any given CMP. More or fewer zones could be used depending upon the needs of the particular data sets, the geology of the area and the specific field conditions of the survey. Those skilled in the art will devise obvious variations to the examples given herein but which will fall within the scope and spirit of this invention which is limited only by the appended claims.

What is claimed is:

1. A method comprising:
   assembling a plurality of seismic data traces formatted in t-x space as a common midpoint gather;
   applying a normal moveout (NMO) correction to the plurality of traces in the common midpoint gather;
   executing a forward Radon transform of said common mid-point gather seismic data signals from t-x space to the τ-p domain;
   arranging the resulting p-values into a series of windows having a preselected range;
   within each window, inversely transforming the seismic data traces from the τ-p domain to t-x space thereby to generate a plurality of filtered midpoint gathers, one corresponding to each p-window;
   applying an inverse NMO correction to the plurality of filtered midpoint gathers; and
   summing said filtered common midpoint gathers.

2. The method of claim 1 wherein said forward Radon transformation is characterized by a linear implementation.

3. The method of claim 1, wherein said forward Radon transformation is characterized by a hyperbolic implementation.

4. The method as defined by claim 1, wherein said forward Radon transformation is characterized by a parabolic implementation.

5. The method as defined by claim 1, wherein said forward Radon transformation is characterized by a quartic implementation.

6. The method of claim 1 wherein said correction for normal moveout is linear.

7. The method of claim 1 wherein said correction for normal moveout is hyperbolic.

8. The method of claim 1 wherein said correction for normal moveout is hyperbolic and quartic.

9. A method comprising:
   a) assembling a plurality of seismic data traces formatted in t-x space as a common midpoint gather and correcting the respective plurality of seismic data traces for hyperbolic moveout;
   b) executing a parabolic forward Radon transform of said common mid-point gather of moveout-corrected seismic data signals from t-x space to the τ-p domain;
   c) separating the moveout corrected, Radon-transformed data into a plurality of zoned data sets each having a range of selected common characteristics;
   d) muting all except one of the zoned data sets;
   e) centering the 0-ordinate of the p-axis relative to the range of the retained one of the zoned data sets;
   f) inversely transforming the retained one of the zoned data set from the τ-p domain to t-x space thereby to generate a filtered CMP gather;
   g) repeating steps d)–f) for each of the others of the plurality of zoned data sets;
   h) inversely applying hyperbolic moveout to said filtered CMP gathers; and
   i) summing said filtered common midpoint gathers.

10. The method as defined by claim 9, wherein the Radon transformation is characterized by a quartic implementation.

11. The method as defined by claim 5, wherein said selected common characteristic is moveout deficit.

* * * * *

UNITED STATES PATENT AND TRADEMARK OFFICE
CERTIFICATE OF CORRECTION

PATENT NO. : 6,018,500　　　　　　　　　　　　　　　　　　　　　　Page 1 of 1
DATED     : January 25, 2000
INVENTOR(S) : Ronald E. Chambers It is certified that error appears in the above-identified patent and that said Letters Patent is hereby corrected as shown below:

Column 5,
Lines 43-46, interchange the order of the two steps.

Column 6,
Lines 37-39, interchange the order of steps h) and i).

Signed and Sealed this

Twenty-first Day of August, 2001

Attest:

NICHOLAS P. GODICI
*Attesting Officer*　　　*Acting Director of the United States Patent and Trademark Office*